United States Patent
Cao et al.

(10) Patent No.: US 11,975,593 B2
(45) Date of Patent: May 7, 2024

(54) HEAT PUMP SYSTEM, HEAT MANAGEMENT METHOD AND VEHICLE

(71) Applicants: Zhejiang Geely Holding Group Co., Ltd., Hangzhou (CN); Chongqing Livan Automobile R&D Institute Co., Ltd, Chongqing (CN)

(72) Inventors: Lanbao Cao, Zhejiang (CN); Quankai Yang, Zhejiang (CN); Zhonggang Liu, Zhejiang (CN); Xiujuan Xu, Zhejiang (CN); Yanlin Liu, Zhejiang (CN); Guopin Tong, Zhejiang (CN); Chao Gao, Zhejiang (CN); Yanli Wang, Zhejiang (CN); Songyan Li, Zhejiang (CN); Ya Cui, Zhejiang (CN); Jingyu Chen, Zhejiang (CN); Feng Qiu, Zhejiang (CN); Jiaqi Zhang, Zhejiang (CN)

(73) Assignees: ZHEJIANG GEELY HOLDING GROUP CO., LTD., Hangzhou (CN); CHONGQING LIVAN AUTOMOBILE R&D INSTITUTE CO., LTD, Chongqing (CN)

(*) Notice: Subject to any disclaimer, the term of this patent is extended or adjusted under 35 U.S.C. 154(b) by 387 days.

(21) Appl. No.: 17/419,721

(22) PCT Filed: Feb. 17, 2020

(86) PCT No.: PCT/CN2020/075468
§ 371 (c)(1),
(2) Date: Jun. 30, 2021

(87) PCT Pub. No.: WO2020/141003
PCT Pub. Date: Jul. 9, 2020

(65) Prior Publication Data
US 2022/0080808 A1 Mar. 17, 2022

(30) Foreign Application Priority Data

Dec. 30, 2018 (CN) .......................... 201811645697.2

(51) Int. Cl.
*B60H 1/32* (2006.01)
*B60H 1/00* (2006.01)
*B60H 1/08* (2006.01)

(52) U.S. Cl.
CPC ........... *B60H 1/08* (2013.01); *B60H 1/00342* (2013.01)

(58) Field of Classification Search
CPC ...... B60H 1/08; B60H 1/00342; B60H 1/008; B60H 1/00921; B60H 1/00392;
(Continued)

(56) References Cited

FOREIGN PATENT DOCUMENTS

| CN | 103975216 A | * | 8/2014 | ......... B60H 1/00342 |
| CN | 104930577 A | | 9/2015 | |

(Continued)

OTHER PUBLICATIONS

The extended European search report of EP application No. 20735881.3 dated Aug. 16, 2022.
Japanese Office Action dated Jan. 25, 2022.

*Primary Examiner* — Emmanuel E Duke
(74) *Attorney, Agent, or Firm* — Andrew C. Cheng

(57) ABSTRACT

A heat pump system, a heat management method and a vehicle are provided. The heat pump system includes an integrated heat exchanger integrated with a superconducting liquid flow passage and a refrigerant flow passage. The refrigerant flow passage is provided inside an on-board refrigerant circulation loop and is used for cooling and/or heating to adjust the temperature within a passenger compartment of a vehicle. The superconducting liquid flow passage is in communication with a motor heat dissipating conduit, for absorbing the heat generated by an on board (Continued)

motor and transferring the heat to the integrated heat exchanger by means of phase change heat transfer. The heat pump system can increase the energy utilization rate for the vehicle and reduce the allowable ambient temperature of the heat pump system.

8 Claims, 3 Drawing Sheets

(58) Field of Classification Search
CPC . B60H 1/143; B60H 1/3213; F25B 2339/047; F25B 27/02; F25B 41/20; F25B 41/31; F25B 13/00; F25B 49/02; F25B 1313/02732
See application file for complete search history.

(56) References Cited

FOREIGN PATENT DOCUMENTS

| | | | | | |
|---|---|---|---|---|---|
| JP | 08-261669 | A | | 10/1996 | |
| JP | 4061820 | B | * | 3/2008 | ... B60H 2001/00961 |
| JP | 2009-526194 | A | | 7/2009 | |
| JP | 2013139995 | A | * | 7/2013 | ......... B60H 1/00921 |
| JP | 2013139995 | A | | 7/2013 | |
| JP | 2019-119220 | A | | 7/2019 | |
| KR | 20180078074 | A | * | 7/2018 | ........... B60H 1/3207 |

\* cited by examiner

HEAT PUMP SYSTEM, HEAT MANAGEMENT METHOD AND VEHICLE

CROSS REFERENCE TO RELATED APPLICATIONS

This application is a 35 U.S.C. § 371 National Phase conversion of International (PCT) Patent Application No. PCT/CN2020/075468, filed on Feb. 17, 2020, which claims the priority of Chinese Patent Application No. 201811645697.2, filed on Dec. 30, 2018. The contents of the above-identified applications are incorporated herein by reference. The PCT International Patent Application was filed and published in Chinese.

TECHNICAL FIELD

The present application relates to the field of vehicle technology, and in particular, to a heat pump system, a heat management method and a vehicle.

BACKGROUND

With the increasing depletion of natural resources, new energy vehicles, as a new generation of transportation tools, are gradually being welcomed by people.

Energy saving is particularly important in new energy vehicles. Currently, new energy vehicles generally use high-pressure water heaters for heating in winter, which have the following three types: 1. resistance film type; 2. PTC type; 3. resistance wire type. In order to meet the demand of the vehicle in winter, the heaters of the above three types have high energy consumption and low efficiency, resulting in a sharp decline in the cruising range of the vehicle in winter, which runs counter to the energy-saving goal.

Therefore, in order to solve this problem, the current major manufactures are aiming at the heat pump system. In winter, the heat pump system is used to provide heat for the vehicle. In this way, there is no need for the power battery of the vehicle to provide additional power for heating the passenger compartment of the vehicle. To a certain extent, the energy consumption of the vehicle is reduced, and the cruising range of the vehicle is increased.

SUMMARY

However, the inventors of the present application find that in winter, the performance of the traditional heat pump systems is poor and cannot meet the heat demand of the vehicle. At the same time, the cost of the entire heat pump system is also very high, by installing the heat pump system on the vehicle, the manufacturing cost of the vehicle is greatly increased. In addition, the inventors of the present application also find that when the motor of the new energy vehicle is working, it will release a large amount of waste heat, which is usually released to the surrounding air in the form of heat energy and is not fully utilized.

Therefore, an object of the present application in the first aspect is provide a heat pump system capable of providing sufficient heat to the vehicle in winter.

Another object of the present application in the first aspect is to reduce the manufacturing cost of the heat pump system.

An object of the present application in the second aspect is to provide a heat management method for a heat pump system, which can provide sufficient heat to the heat pump system of the vehicle in winter.

An object of the present application in the third aspect is to provide a vehicle including the above heat pump system or adopting the above heat management method for heat management. The heat pump system can provide sufficient heat to the heat pump system of the vehicle in winter.

According to the first aspect of the present application, the present application provides a heat pump system, the heat pump system includes an integrated heat exchanger integrated with a superconducting liquid flow passage and a refrigerant flow passage;

the refrigerant flow passage is provided inside an on-board refrigerant circulation loop and is configured for cooling and/or heating to adjust the temperature in a passenger compartment of a vehicle;

the superconducting liquid flow passage is in communication with a motor heat dissipating conduit, the motor heat dissipating conduit and the superconducting liquid flow passage are filled with a superconducting liquid, the superconducting liquid is capable of absorbing the heat generated by an on-board motor during working, and the heat is transferred to the superconducting liquid flow passage through heat transfer of phase change.

Further, the integrated heat exchanger includes a plurality of flat tubes, the flat tube of the integrated heat exchanger has a double-layer tube structure. the flat tube includes a refrigerant flat tube and a superconducting liquid flat tube sleeved on the outside of the refrigerant flat tube, the refrigerant flow passage is provided in the refrigerant flat tube, and the superconducting liquid flow passage is provided in the superconducting liquid flat tube.

Further, the integrated heat exchanger includes a plurality of flat tubes, a cross section of each flat tube is a porous structure, and the porous structure is composed of a plurality of refrigerant flow passages and a plurality of superconducting liquid flow passages, the plurality of refrigerant flow passages are spaced apart from each other and are located in a first plane, the plurality of liquid flow passages are spaced apart from each other and are located in a second plane and a third plane, wherein the first plane, the second plane and the third plane are parallel to each other, and the first plane is located between the second plane and the third plane.

Further, the integrated heat exchanger further includes a refrigerant collecting pipe and a superconducting liquid collecting pipe;

the refrigerant collecting pipe is provided at both ends of the plurality of refrigerant flow passages and is in communication with each of the refrigerant flow passages;

the superconducting liquid collecting pipe is provided at one end of the plurality of superconducting liquid flow passages and is in communication with each of the superconducting liquid flow passages, the refrigerant collecting pipe and the superconducting liquid collecting pipe are isolated from each other, so that the refrigerant circulates in the refrigerant flow passages and the refrigerant collecting pipe, and the superconducting liquid is sealed in the superconducting liquid flow passages and the superconducting liquid collecting pipe and transfers heat through phase change without flowing;

the superconducting liquid collecting pipe is located between the superconducting liquid flow passages and the motor heat dissipating conduit.

Further, the motor heat dissipating conduit is in contact with a motor controller, and the superconducting liquid in the motor heat dissipating conduit absorbs the waste heat emitted by the motor controller during work, and dissipates the waste heat emitted by the motor controller during work.

Further, the refrigerant circulation loop includes a compressor, an on-board condenser, an on-board evaporator and the integrated heat exchanger, which are connected in sequence.

Further, the refrigerant circulation loop further includes a first solenoid three-way valve, a second solenoid three-way valve, and a solenoid valve;

a first port of the first solenoid three-way valve is in communication with the on-board condenser, a second port of the first solenoid three-way valve is in communication with one end of the second solenoid three-way valve, and a third port of the first solenoid three-way valve is in communication with the integrated heat exchanger when the heat pump system is in a refrigerating mode;

a first port of the second solenoid three-way valve is in communication with the on-board evaporator, a second port of the second solenoid three-way valve is in communication with the first solenoid three-way valve, and a third port of the second solenoid three-way valve is in communication with the compressor;

one end of the solenoid valve is in communication with the integrated heat exchanger, and the other end of the solenoid valve is in communication with the compressor.

Further, the refrigerant circulation loop further includes a first expansion valve and a second expansion valve which are configured to change the pressure and temperature of the refrigerant in the refrigerant circulation loop, the first expansion valve is located between the on-board condenser and the on-board evaporator, the second expansion valve is located between the on-board evaporator and the integrated heat exchanger; and the refrigerant circulation loop further includes a gas-liquid separator, a liquid outlet of the gas-liquid separator is in communication with the compressor, a liquid inlet of the gas-liquid separator is in communication with the solenoid valve when the heat pump system is in the heating and dehumidifying mode, and is in communication with the third port of the second solenoid three-way valve when the heat pump system is in the refrigerating mode; the gas-liquid separator is configured for performing gas-liquid separation to the refrigerant entering the compressor and exporting the separated gaseous refrigerant to the compressor, so as to protect the compressor.

According to the second aspect of the present application, the present application provides a heat management method for a heat pump system, which includes:

when the heat pump system is in a heating and dehumidifying mode, a refrigerant is controlled to start from a compressor and sequentially pass through an on-board condenser, an on-board evaporator and an integrated heat exchanger, and finally return back to the compressor;

when the heat pump system is in a refrigerating mode, the refrigerant is controlled to start from the compressor and sequentially pass through the on-board condenser, the integrated heat exchanger and the on-board evaporator, and finally return back to the compressor; and in the heating and dehumidifying mode of the heat pump system, when the refrigerant passes through the on-board condenser, the refrigerant releases heat to a passenger compartment of a vehicle to increase the temperature within the vehicle; when the refrigerant passes through the on-board evaporator, the refrigerant evaporates and absorbs heat to reduce the humidity within the vehicle; when the refrigerant passes through the integrated heat exchanger, the refrigerant evaporates to absorb the heat of a superconducting liquid in a superconducting liquid flow passage and the heat in the air.

According to the third aspect of the present application, the present application provides a vehicle equipped with the above-mentioned heat pump system or adopting the above-mentioned thermal management method for heat management, wherein an on-board motor of the vehicle is a driving motor which provides driving power, or a variable speed motor, or a wiper motor.

In the heat pump system, heat management method and vehicle of the present application, an integrated heat exchanger is provided. The integrated heat exchanger is provided with a superconducting liquid flow passage and a refrigerant flow passage, the refrigerant flow passage is provided inside the on-board refrigerant circulation loop, and the superconducting liquid flow passage is in communication with the motor heat dissipating conduit. The integrated heat exchanger is configured such that under a heating mode or a heating and dehumidifying mode, the refrigerant in the refrigerant flow passage absorbs the heat emitted by the superconducting liquid in the superconducting liquid flow passage inside the integrated heat exchanger for use by the heat pump system, which makes up for the defect of insufficient heat absorption of the heat pump system from the surrounding environment in winter, so that the heat pump system can work normally and provide enough heat to the vehicle, the working efficiency of the heat pump system is greatly improved, and also the allowable ambient temperature of the heat pump system is expanded. Since the heat provided to the vehicle does not need to consume too much power of the power battery, it indirectly increases the cruising range of new energy vehicles. Meanwhile, the heat emitted by the motor during working is reused, which also improves the energy utilization rate of the vehicle and is in line with the current trend of energy saving.

Further, under the heating and dehumidifying mode of traditional heat pump systems, the refrigerant starts from the compressor, and after it flows through the on-board condenser, it returns to the compressor in two paths. One path is to enter the integrated heat exchanger through the throttling effect of the expansion valve for heat exchange, and then flow out, and return to the compressor through the diversion effect of the solenoid valve. The other path is to flow into the on-board evaporator for heat absorption and dehumidification through the diversion effect of the solenoid valve and the throttling effect of the expansion valve, and then flow out from the on-board evaporator, and return to the compressor after pressure regulation by the refrigerant pressure balance valve. However, under the heating and dehumidifying mode of the heat pump system of the present application; by connecting the on-board condenser, the on-board evaporator and the integrated heat exchanger in series, the heat pump system of the present application can reduce the number of the solenoid valves and the refrigerant pressure balance valves in the refrigerant circulation loop of the heat pump system through reasonable pipeline layout, which not only simplifies the structure of the heat pump system, makes its arrangement in the vehicle more simple, but also effectively reduces the manufacturing cost of the heat pump system.

BRIEF DESCRIPTION OF THE DRAWINGS

Hereinafter, some specific embodiments of the present application will be described in detail in an exemplary rather than restrictive manner with reference to the accompanying drawings. The same reference signs in the drawings indicate the same or similar components or parts. Those skilled in the art should understand that these drawings are not necessarily drawn to scale. In the drawings.

DETAILED DESCRIPTION OF PREFERRED EMBODIMENTS

Figure 1:
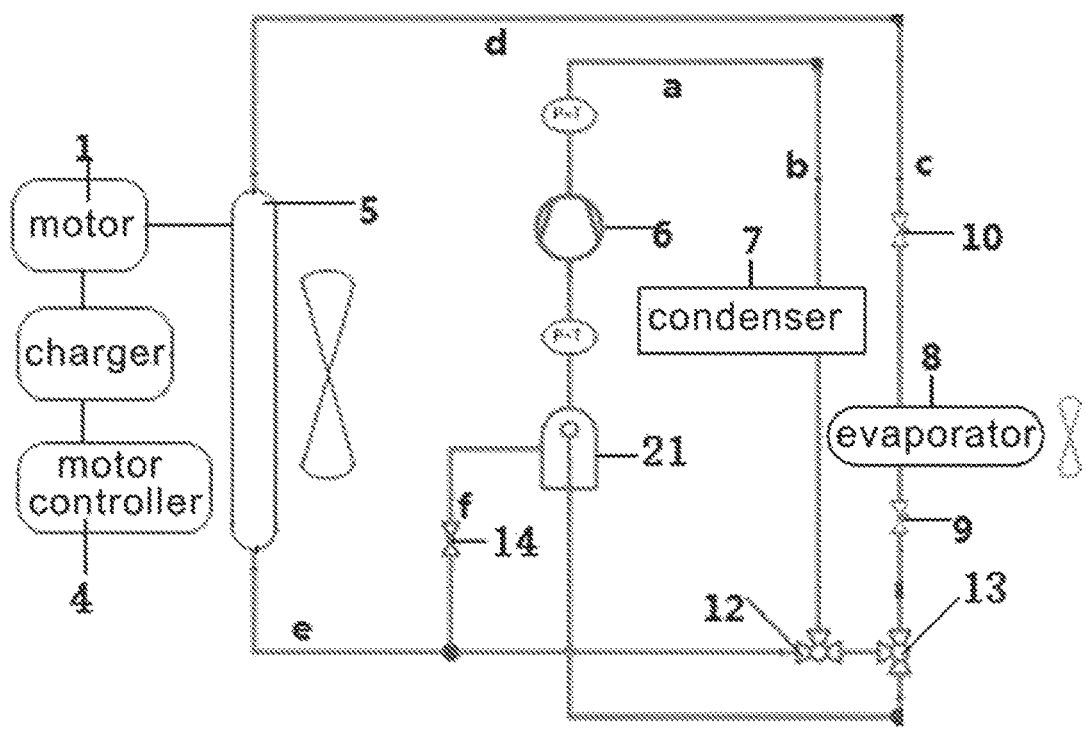
FIG. 1 is a schematic block diagram of a heat pump system according to an embodiment of the present application.

FIG. 1 is a schematic block diagram of a heat pump system according to an embodiment of the present application. As shown in FIG. 1, the heat pump system includes an integrated heat exchanger 5 integrated with a superconducting liquid flow passage and a refrigerant flow passage. The refrigerant flow passage is provided inside an on-board refrigerant circulation loop and is used for cooling and/or heating to adjust the temperature in the passenger compartment of the vehicle. The superconducting liquid flow passage is in communication with a motor heat dissipating conduit. The motor heat dissipating conduit and the superconducting liquid flow passage are filled with a superconducting liquid, and the superconducting liquid can absorb the heat generated by the on-board motor 1 during working, and the heat is transferred to the superconducting liquid flow passage through heat transfer of phase change.

Specifically, when the heat generated by the on-board motor 1 during working is transferred to the superconducting liquid flow passage, the superconducting liquid flow passage emits heat to be absorbed by a refrigerant in the refrigerant flow passage, and then the heat is transferred through the refrigerant circulation loop to the passenger compartment. The phase change of the superconducting liquid herein means that the superconducting liquid molecules transfer heat to the adjacent low-temperature superconducting liquid molecules through their own molecular vibrations. The superconducting liquid may be made of potassium sulfate, potassium dichromate and secondary distilled water in a certain proportion. Thus, the heat generated by the on-board motor 1 can be transferred out by the superconducting liquid and finally transferred to the interior of the integrated heat exchanger 5 for being absorbed by the refrigerant. Therefore, there is no need to install a water pump in the motor heat dissipating conduit to pump the superconducting liquid in order to enable the superconducting liquid to circulate and transfer the heat generated by the on-board motor 1, which not only has a simple structure, but also effectively saves energy and greatly reduces manufacturing costs, and which is in line with the current energy-saving trend. As shown in FIG. 1, the refrigerant circulation loop may include a loop formed by a, b, c, d, e, and f pipes.

The heat pump system of the present application is provided with an integrated heat exchanger 5, the integrated heat exchanger 5 is provided with a superconducting liquid flow passage and a refrigerant flow passage, the refrigerant flow passage is provided inside the on-board refrigerant circulation loop, and the superconducting liquid flow passage is in communication with the motor heat dissipating conduit. The integrated heat exchanger 5 is configured such that under a heating mode or a heating and dehumidifying mode, the refrigerant in the refrigerant flow passage absorbs the heat emitted by the superconducting liquid in the superconducting liquid flow passage inside the integrated heat exchanger 5 for use by the heat pump system, which makes up for the defect of insufficient heat absorption of the heat pump system from the surrounding environment in winter, so that the heat pump system can work normally and provide enough heat to the vehicle, the working efficiency of the heat pump system is greatly improved, and also the allowable ambient temperature of the heat pump system is expanded. Since the heat provided to the vehicle does not need to consume too much power of the power battery, it indirectly increases the cruising range of new energy vehicles. Meanwhile, the heat emitted by the motor during working is reused, which also improves the energy utilization rate of the vehicle and is in line with the current trend of energy saving.

Figure 2:
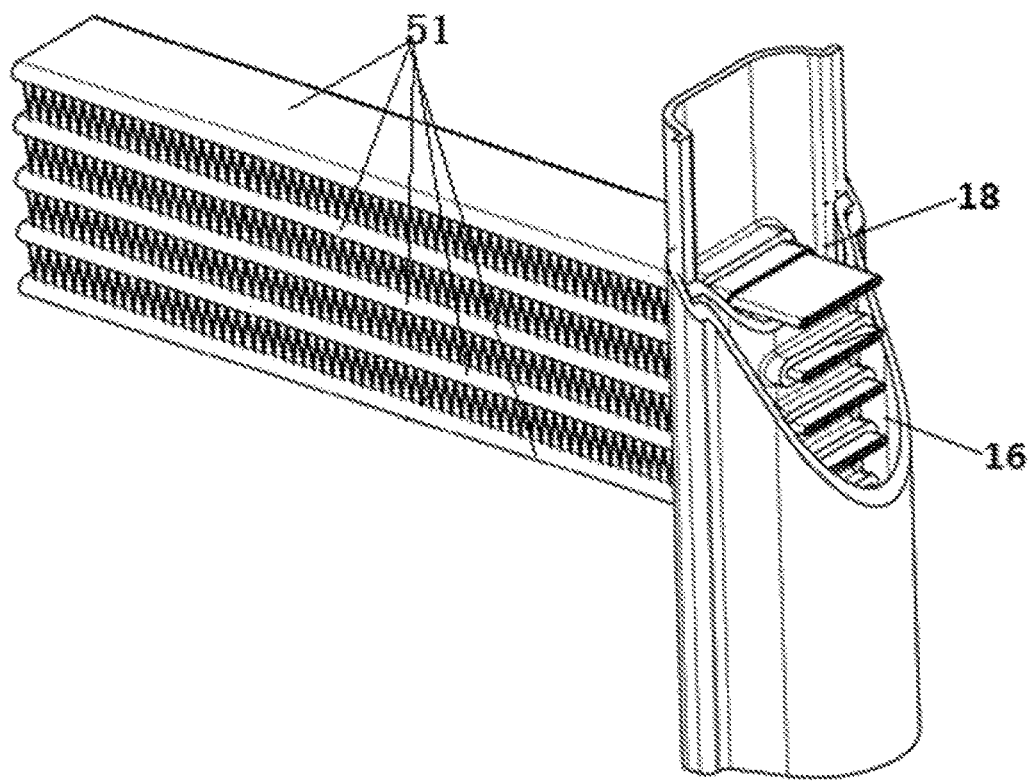
FIG. 2 is a schematic diagram of an integrated heat exchanger according to an embodiment of the present application.
Figure 3:
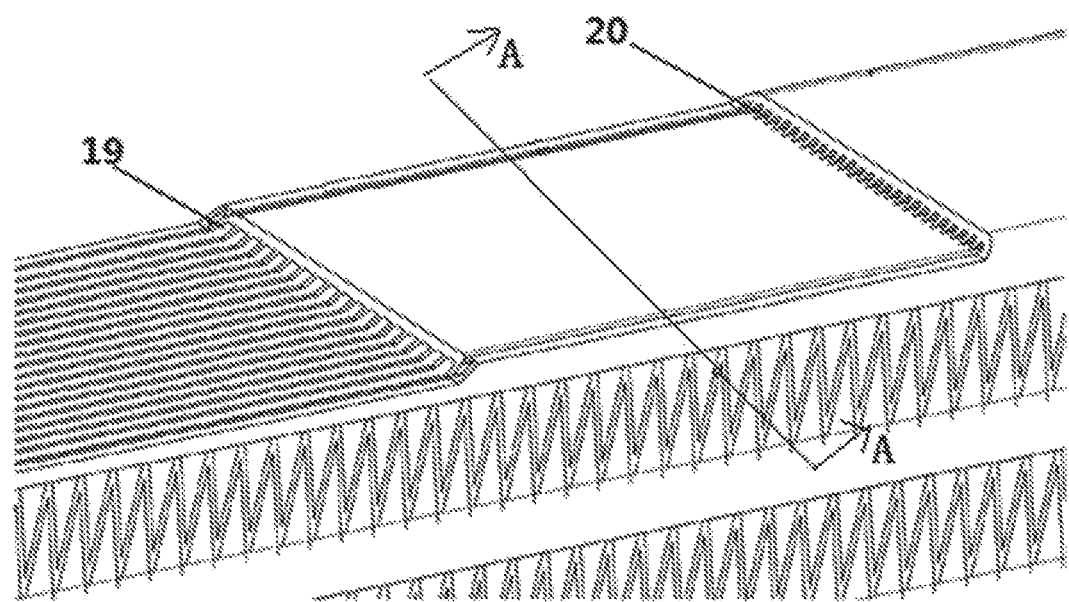
FIG. 3 is a schematic diagram of the refrigerant flow passage and the superconducting liquid flow passage of an integrated heat exchanger according to an embodiment of the present application.
Figure 4:
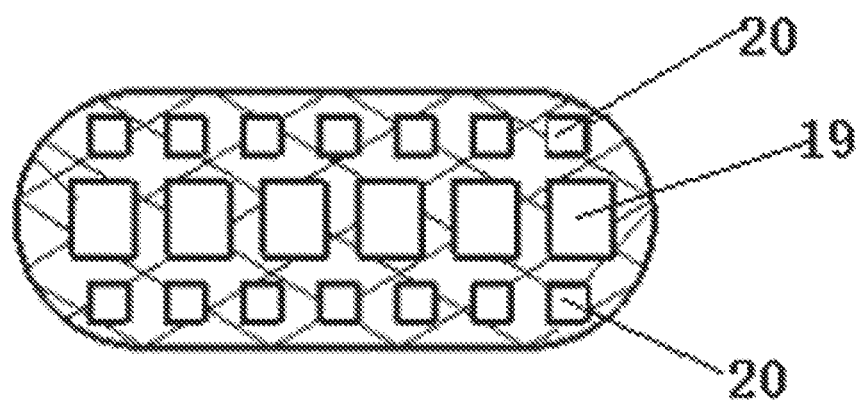
FIG. 4 is a schematic cross-sectional view of the flat tube taken along line A-A of FIG. 3.

Further, as an embodiment of the present application, FIG. 2 is a schematic diagram of an integrated heat exchanger according to an embodiment of the present application, FIG. 3 is a schematic diagram of the refrigerant flow passage and the superconducting liquid flow passage of an integrated heat exchanger according to an embodiment of the present application, and FIG. 4 is a schematic cross-sectional view of the flat tube taken along line A-A of FIG. 3. As shower in FIG. 2, the integrated heat exchanger 5 includes a plurality of flat tubes 51, and the cross section of each flat tube 51 is a porous structure (as shown in FIG. 4), and the porous structure is composed of a plurality of refrigerant flow passages 19 and a plurality of superconducting liquid flow passages 20 (as shown in FIGS. 3 and 4). The plurality of refrigerant flow passages 19 are spaced apart from each other and are located in a first plane. The plurality of liquid flow passages 20 are spaced apart from each other and are located in a second plane and a third plane, wherein the first plane, the second plane and the third plane are parallel to each other, and the first plane is located between the second plane and the third plane.

Meanwhile, as shown in FIG. 2, the integrated heat exchanger 5 further includes a refrigerant collecting pipe 16 and a superconducting liquid collecting pipe 18. As shown in FIGS. 2 and 3, the refrigerant collecting pipe 16 is provided at both ends of the plurality of refrigerant flow passages 19 and is in communication with each of the refrigerant flow passages 19. The superconducting liquid collecting pipe 18 is provided at one end of the plurality of superconducting liquid flow passages 20 and is in communication with each of the superconducting liquid flow passages 20. The refrigerant collecting pipe 16 and the superconducting liquid collecting pipe 18 are isolated from each other, so that the refrigerant circulates in the refrigerant flow passages 19 and the refrigerant collecting pipe 16, and the superconducting liquid is sealed in the superconducting liquid flow passages 20 and the superconducting liquid collecting pipe 18 and transfers heat through phase change without flowing. Specifically, the superconducting liquid collecting pipe 18 is located between the superconducting liquid flow passages 20 and the motor heat dissipating conduit.

Through the arrangement of the above structure, the heat generated by the on-board motor 1 can be fully absorbed by the refrigerant and transferred to the passenger compartment, thus effectively improving the energy utilization rate of the vehicle.

Meanwhile, in another embodiment of the present application, the integrated heat exchanger 5 has a flat tube, and the flat tube has a double-layer tube structure. The flat tube includes a refrigerant flat tube and a superconducting liquid flat tube sleeved on the outside of the refrigerant flat tube. The refrigerant flow passage is provided in the refrigerant flat tube, and the superconducting liquid flow passage is provided in the superconducting liquid flat tube.

In this embodiment, the structure of the integrated heat exchanger 5 is similar to the structure of the integrated heat exchanger in FIG. 2, except that there is only one refrigerant flow passage inside the refrigerant flat tube, there is only one superconducting liquid flow passage in the superconducting liquid flat tube, and the superconducting liquid flow passage is formed between an outer wall of the refrigerant flat tube and an inner wall of the superconducting liquid flat tube. Through the above arrangement, not only can more superconducting liquid enter the superconducting liquid flow passage to provide heat, but also since the refrigerant in the refrigerant flow passage and the superconducting liquid in the superconducting liquid flow passage are only separated by a flat tube thickness, it is easier and more fully for the refrigerant to absorb the heat of the superconducting liquid for heating the passenger compartment.

Meanwhile, in an embodiment of the present application, as shown in FIG. 1, the motor heat dissipating conduit is in contact with the motor controller 4. The superconducting liquid in the motor heat dissipating conduit absorbs the waste heat emitted by the motor controller 4 during work, and dissipates the waste heat emitted by the motor controller 4 during work. In this way, the heat pump system also utilizes the waste heat generated by the motor controller 4 during work, thereby further improving the energy utilization rate of the whole vehicle. At the same time, the waste heat generated by the motor controller 4 during work is timely dissipated through the motor heat dissipating conduit, which is also beneficial to extend the working life of the motor controller 4.

Further, as shown in FIG. 1, the refrigerant circulation loop includes a compressor 6, an on-board condenser 7, an on-board evaporator 8 and the integrated heat exchanger 5, which are connected in sequence. Meanwhile, as shown in FIG. 1, the refrigerant circulation loop further includes a first solenoid three-way valve 12, a second solenoid three-way valve 13, and a solenoid valve 14. A first port of the first solenoid three-way valve 12 is in communication with the on-board condenser 7, a second port of the first solenoid three-way valve 12 is in communication with one end of the second solenoid three-way valve 13, and a third port of the first solenoid three-way valve 12 is in communication with the integrated heat exchanger 5 when the heat pump system is in a refrigerating mode. A first port of the second solenoid three-way valve 13 is in communication with the on-board evaporator 8, a second port of the second solenoid three-way valve 13 is in communication with the first solenoid three-way valve 12, and a third port of the second solenoid three-way valve 13 is in communication with the compressor 6. One end of the solenoid valve 14 is in communication with the integrated heat exchanger 5, and the other end of the solenoid valve 14 is in communication with the compressor 6.

Further, as shown in FIG. 1, the refrigerant circulation loop further includes a first expansion valve 9 and a second expansion valve 10. The first expansion valve 9 is located between the on-board condenser 7 and the on-board evaporator 8. The second expansion valve 10 is located between the on-board evaporator 8 and the integrated heat exchanger 5. The first expansion valve 9 and the second expansion valve 10 are used to change the pressure and temperature of the refrigerant in the refrigerant circulation loop.

Meanwhile, as shown in FIG. 1, the refrigerant circulation loop may also include a gas-liquid separator 21. A liquid outlet of the gas-liquid separator 21 is in communication with the compressor 6. A liquid inlet of the gas-liquid separator 21 is in communication with the solenoid valve 14 when the heat pump system is in the heating and dehumidifying mode, and is in communication with the third port of the second solenoid three-way valve 13 when the heat pump system is in the refrigerating mode. The gas-liquid separator 21 is used for performing gas-liquid separation to the refrigerant entering the compressor 6 and exporting the separated gaseous refrigerant to the compressor 6, so as to protect the compressor 6.

In addition, in an embodiment of the present application, a heat management method for the heat pump system is further provided, which includes:

when the heat pump system is in the heating and dehumidifying mode, the refrigerant is controlled to start from the compressor and sequentially pass through the on-board condenser, the on-board evaporator and the integrated heat exchanger, and finally return back to the compressor;

when the heat pump system is in the refrigerating mode, the refrigerant is controlled to start from the compressor and sequentially pass through the on-board condenser, the integrated heat exchanger and the on-board evaporator, and finally return back to the compressor; and in the heating and dehumidifying mode of the heat pump system, when the refrigerant passes through the on-board condenser, the refrigerant releases heat to the passenger compartment of the vehicle to increase the temperature within the vehicle; when the refrigerant passes through the on-board evaporator, the refrigerant evaporates and absorbs heat to reduce the humidity within the vehicle; when the refrigerant passes through the integrated heat exchanger, the refrigerant evaporates to absorb the heat of the superconducting liquid in the superconducting liquid flow passage and the heat in the air.

Figure 5:
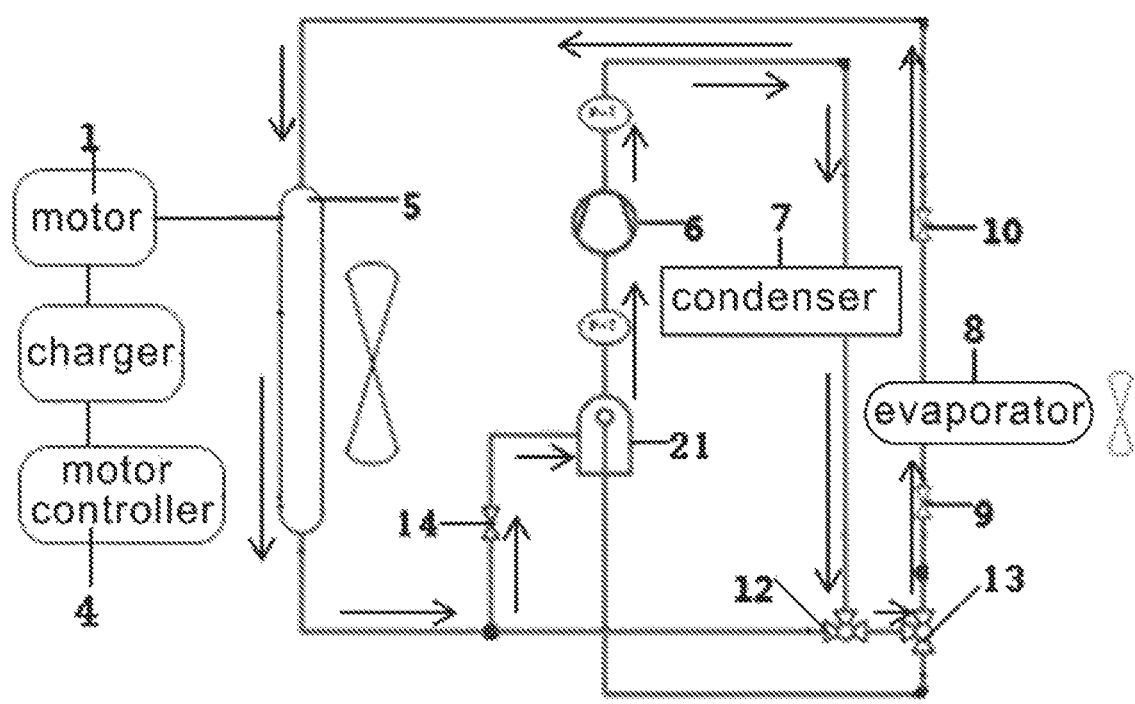
FIG. 5 is a schematic diagram showing the flowing of the refrigerant under the heating and dehumidifying mode according to an embodiment of the present application.

Specifically, FIG. 5 is a schematic diagram showing the flowing of the refrigerant under the heating and dehumidifying mode according to an embodiment of the present application, wherein the direction of arrows in the figure represents the flowing direction of the refrigerant. As shown in FIG. 5, in the heating and dehumidifying mode, the refrigerant starts from the compressor 6 and sequentially passes through the on-board condenser 7, the on-board evaporator 8 and the integrated heat exchanger 5, and finally returns back to the compressor 6, so as to provide heat to the passenger compartment of the vehicle to ensure the comfort of the passengers. However, when the heat pump system is in the refrigerating mode, the refrigerant is controlled to start from the compressor 6 and sequentially pass through the on-board condenser 7, the integrated heat exchanger 5 and the on-board evaporator 8, and finally return back to the compressor 6.

Therefore, under the heating and dehumidifying mode, the heat management method of the heat pump system of the present application enables the refrigerant to work normally by connecting the compressor 6, the on-board condenser 7, the on-board evaporator 8 and the integrated heat exchanger 5 in series and by the throttling effect of the first expansion valve 9 and the second expansion valve 10, so as to ensure the working efficiency and safety of the heat pump system. Under the heating and dehumidifying mode of traditional heat pump systems, the refrigerant starts from the compressor, and after it flows through the on-board condenser, it returns to the compressor in two paths. One path is to enter the integrated heat exchanger through the throttling effect of the expansion valve for heat exchange, and then flow out, and return to the compressor through the diversion effect of the solenoid valve. The other path is to flow into the on-board evaporator for heat absorption and dehumidification through the diversion effect of the solenoid valve and the throttling effect of the expansion valve, and then flow out from the on-board evaporator, and return to the compressor after pressure regulation by the refrigerant pressure balance valve. However, the heat pump system of the present application can reduce the number of the solenoid valves and the refrigerant pressure balance valves in the refrigerant circulation loop of the heat pump system through reasonable pipeline layout. Therefore, it not only greatly simplifies the structure of the heat pump system, makes the control of the system simple, reduces the difficulty of the system layout in the vehicle, improves the production speed, but also effectively reduces the manufacturing cost of the system, reduces the weight of the vehicle, and effectively improves the production efficiency.

Further, in the heating and dehumidifying mode of the heat pump system, when the refrigerant passes through the on-board condenser 7, the refrigerant releases heat to the passenger compartment of the vehicle to improve the temperature within the vehicle; when the refrigerant passes through the on-board evaporator 8, a part of the refrigerant evaporates and absorbs heat, causing the water vapor in the passenger compartment of the vehicle to release heat and liquefy into small droplets to reduce the humidity within the vehicle; when the refrigerant passes through the integrated heat exchanger 5, another part of the refrigerant evaporates to absorb the heat of the superconducting liquid in the superconducting liquid flow passage and the heat in the air. Herein, when the refrigerant enters the integrated heat exchanger 5 for evaporation, it first passes through the on-board evaporator 8 to evaporate, which can dehumidify the interior of the vehicle. At the same time, through the throttling effect of the second expansion valve 10, the refrigerant smoothly enters the integrated heat exchanger 5 from the on-board evaporator 8, which can save the pressure balance valve set in the ordinary heat pump systems and effectively reduce the cost, and which is also in line with the lightweight design of the vehicle.

In addition, in an embodiment of the present application, a vehicle is further provided. The vehicle is provided with the above heat pump system, or adopts the above heat management method for heat management. The on-board motor of the vehicle is a driving motor which provides driving power, or a variable speed motor, or a wiper motor.

The vehicle is provided with the heat pump system, the integrated heat exchanger 5 is provided with a superconducting liquid flow passage and a refrigerant flow passage, the refrigerant flow passage is provided inside the on-board refrigerant circulation loop, and the superconducting liquid flow passage is in communication with the motor heat dissipating conduit. The integrated heat exchanger 5 is configured such that under the heating mode or the heating and dehumidifying mode, the refrigerant, in the refrigerant flow passage absorbs the heat emitted by the superconducting liquid in the superconducting liquid flow passage inside the integrated heat exchanger 5 for use by the heat pump system, which makes up for the defect of insufficient heat absorption of the heat pump system from the surrounding environment in winter, so that the heat pump system can work normally and provide enough heat to the vehicle, thereby greatly improving the efficiency of the heat pump system while expanding the allowable ambient temperature of the heat pump system. Because the heat supplied to the vehicle does not need to consume too much power of the power battery, it indirectly improves the cruising range of new energy vehicles. Meanwhile, the heat emitted by the motor during working is reused, which also improves the energy utilization rate of the whole vehicle and which is in line with the current trend of energy saving.

So far, those skilled in the art should realize that although the exemplary embodiments of the present application have been shown and described in detail herein, many other variants or modifications in accordance with the principles of the present application can be directly determined or derived from the contents of the present disclosure without departing from the spirit and scope of the present application. Therefore, the scope of the present application should be understood and recognized as covering all these other variants or modifications.

What is claimed is:

1. A heat pump system, the heat pump system comprising an integrated heat exchanger integrated with a superconducting liquid flow passage and a refrigerant flow passage;
    wherein the refrigerant flow passage is provided inside an on-board refrigerant circulation loop and is configured for cooling and/or heating to adjust the temperature in a passenger compartment of a vehicle;
    the superconducting liquid flow passage is in communication with a motor heat dissipating conduit, the motor heat dissipating conduit and the superconducting liquid flow passage are both filled with a superconducting liquid, the superconducting liquid is capable of absorbing the heat generated by an on-board motor during operation, and the heat is transferred to the superconducting liquid flow passage through heat transfer of phase change;
    the refrigerant circulation loop comprises a compressor, an on-board condenser, an on-board evaporator and the integrated heat exchanger, which are connected in sequence;
    the refrigerant circulation loop further comprises a first solenoid three-way valve, a second solenoid three-way valve, and a solenoid valve;
    a first port of the first solenoid three-way valve is in communication with the on-board condenser, a second port of the first solenoid three-way valve is in communication with one end of the second solenoid three-way valve, and a third port of the first solenoid three-way valve is in communication with the integrated heat exchanger when the heat pump system is in a refrigerating mode;
    a first port of the second solenoid three-way valve is in communication with the on-board evaporator, a second port of the second solenoid three-way valve is in communication with the first solenoid three-way valve, and a third port of the second solenoid three-way valve is in communication with the compressor;
    one end of the solenoid valve is in communication with the integrated heat exchanger, and the other end of the solenoid valve is in communication with the compressor.

2. The heat pump system according to claim 1, wherein the integrated heat exchanger comprises a plurality of flat tubes, the flat tube of the integrated heat exchanger has a double-layer tube structure, the flat tube includes a refrigerant flat tube and a superconducting liquid flat tube sleeved on the outside of the refrigerant flat tube, the refrigerant flow passage is provided in the refrigerant flat tube, and the superconducting liquid flow passage is provided in the superconducting liquid flat tube.

3. The heat pump system according to claim 1, wherein the integrated heat exchanger comprises a plurality of flat tubes, a cross section of each flat tube is a porous structure, and the porous structure is composed of a plurality of refrigerant flow passages and a plurality of superconducting liquid flow passages, the plurality of refrigerant flow passages are spaced apart from each other and are located in a first plane, the plurality of liquid flow passages are spaced apart from each other and are located in a second plane and a third plane, wherein the first plane, the second plane and the third plane are parallel to each other, and the first plane is located between the second plane and the third plane.

4. The heat pump system according to claim 3, wherein the integrated heat exchanger further comprises a refrigerant collecting pipe and a superconducting liquid collecting pipe;
the refrigerant collecting pipe is provided at both ends of the plurality of refrigerant flow passages and is in communication with each of the refrigerant flow passages;
the superconducting liquid collecting pipe is provided at one end of the plurality of superconducting liquid flow passages and is in communication with each of the superconducting liquid flow passages, the refrigerant collecting pipe and the superconducting liquid collecting pipe are isolated from each other, so that the refrigerant circulates in the refrigerant flow passages and the refrigerant collecting pipe, and the superconducting liquid is sealed in the superconducting liquid flow passages and the superconducting liquid collecting pipe and transfers heat through phase change without flowing;
the superconducting liquid collecting pipe is located between the superconducting liquid flow passages and the motor heat dissipating conduit.

5. The heat pump system according to claim 1, wherein the motor heat dissipating conduit is in contact with a motor controller, and the superconducting liquid in the motor heat dissipating conduit absorbs the waste heat emitted by the motor controller during work, and dissipates the waste heat emitted by the motor controller during work.

6. The heat pump system according to claim 1, wherein the refrigerant circulation loop further comprises a first expansion valve and a second expansion valve which are configured to change the pressure and temperature of the refrigerant in the refrigerant circulation loop, the first expansion valve is located between the on-board condenser and the on-board evaporator, the second expansion valve is located between the on-board evaporator and the integrated heat exchanger; and the refrigerant circulation loop further comprises a gas-liquid separator, a liquid outlet of the gas-liquid separator is in communication with the compressor, a liquid inlet of the gas-liquid separator is in communication with the solenoid valve when the heat pump system is in the heating and dehumidifying mode, and is in communication with the third port of the second solenoid three-way valve when the heat pump system is in the refrigerating mode; the gas-liquid separator is configured for performing gas-liquid separation to the refrigerant entering the compressor and exporting the separated gaseous refrigerant to the compressor, so as to protect the compressor.

7. A vehicle equipped with the heat pump system according to claim 1, wherein the on-board motor of the vehicle is a driving motor which provides driving power, or a variable speed motor, or a wiper motor.

8. A heat management method for a heat pump system, comprising:
when the heat pump system is in a heating and dehumidifying mode, a refrigerant is controlled to start from a compressor and sequentially pass through an on-board condenser, an on-board evaporator and an integrated heat exchanger, and finally return back to the compressor;
when the heat pump system is in a refrigerating mode, the refrigerant is controlled to start from the compressor and sequentially pass through the on-board condenser, the integrated heat exchanger and the on-board evaporator, and finally return back to the compressor; and
in the heating and dehumidifying mode of the heat pump system, when the refrigerant passes through the on-board condenser, the refrigerant releases heat to a passenger compartment of a vehicle to increase the temperature within the vehicle; when the refrigerant passes through the on-board evaporator, the refrigerant evaporates and absorbs heat to reduce the humidity within the vehicle; when the refrigerant passes through the integrated heat exchanger, the refrigerant evaporates to absorb the heat of a superconducting liquid in a superconducting liquid flow passage and the heat in the air.

\* \* \* \* \*